United States Patent [19]

Getman

[11] 4,159,024

[45] Jun. 26, 1979

[54] FLUID CONTROL VALVE

[75] Inventor: Ronald K. Getman, Cedar Rapids, Iowa

[73] Assignee: Commercial Shearing, Inc., Youngstown, Ohio

[21] Appl. No.: 807,060

[22] Filed: Jun. 16, 1977

[51] Int. Cl.² .................. F16K 11/07; F16K 24/02
[52] U.S. Cl. ................... 137/312; 137/625.48; 251/DIG. 1
[58] Field of Search ................ 137/312, 625.48; 251/DIG. 2

[56] References Cited

U.S. PATENT DOCUMENTS

| 2,765,808 | 10/1956 | Tydeman | 137/312 |
| 3,000,399 | 9/1961 | Brukner | 137/625.48 |

*Primary Examiner*—Arnold Rosenthal
*Attorney, Agent, or Firm*—James C. Nemmers; Haven E. Simmons

[57] ABSTRACT

The invention relates to a high pressure control valve of the spool type. The valve contains a series of fluid passageways which drain off the high pressure fluid before it reaches the sealed area of the spool thus allowing the spool to be shifted with a minimum of force even though under high internal fluid pressure. The invention thus increases the life of elastomer seals used in high pressure fluid control valves.

7 Claims, 2 Drawing Figures

FLUID CONTROL VALVE

BACKGROUND OF THE INVENTION

The invention relates to a spool type fluid control valve, either hydraulic or pneumatic, which operates under high pressure.

Spool valves which operate under high pressure generally are manufactured with metal-to-metal contact between the bore and the internal valve spool lands. When used in high pressure applications, leakage occurs between the bore and lands even though considerable expense is incurred in polishing the surfaces of the bore and valve lands to an extremely small tolerance. Therefore, it is common practice to include elastomer type seals between the bore and outermost lands of the spool to prevent external leakage of the fluid. In high pressure applications, the use of elastomer type seals between the bore and the outermost spool lands is not entirely satisfactory because such seals bind and the high friction forces make it difficult to shift the spool. Moreover, such seals deform under high pressure and are forced into surface imperfections in the bore resulting in abrasion of the elastomer seal as the spool is shifted.

There is therefore a need for a high-pressure spool-type fluid control valve which can utilize elastomer type seals which do not bind due to high friction and which have increased life and minimal failure compared to present valve designs.

SUMMARY OF THE INVENTION

A spool valve constructed according to the present invention utilizes an arrangement of passageways which drain off the high pressure fluid before it reaches the sealed area. This allows an elastomer type seal to always be subjected only to low pressure.

The invention is accomplished by relatively inexpensive manufacturing methods and produces a spool valve that is reliable even under relatively high operating pressures.

The invention further produces a spool valve which can be manually operated since the force required to shift the spool is relatively small even under high operating pressures.

DESCRIPTION OF THE PREFERRED EMBODIMENT OF THE INVENTION

Figure 1:
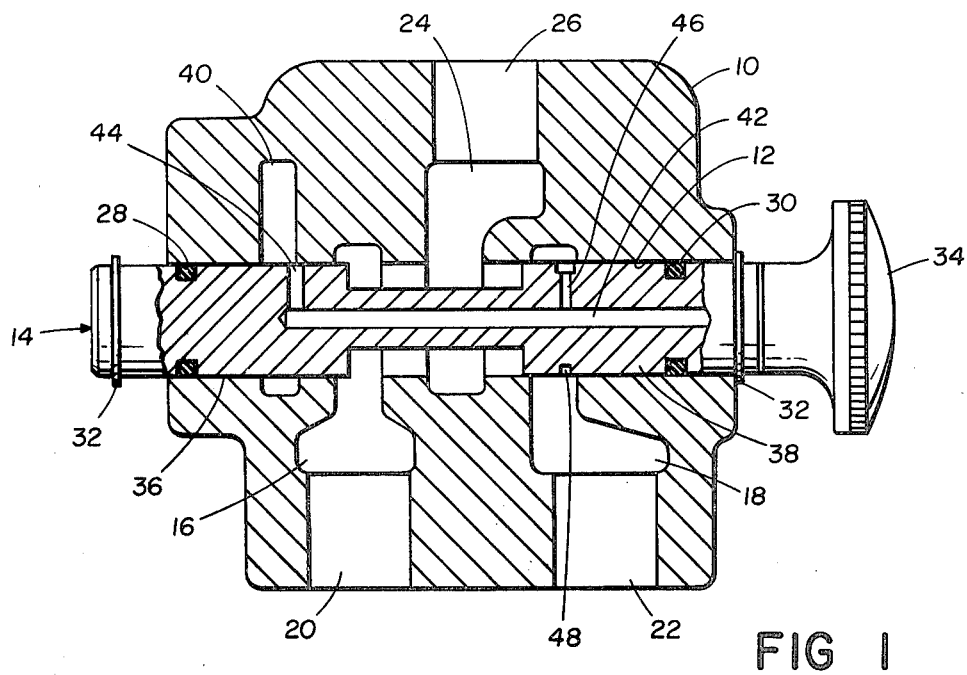
FIG. 1 is an elevational view, mostly in section, showing a spool valve constructed according to the invention with the spool shifted to the extreme left position.

The invention is illustrated in connection with a two-way manually-operated hydraulic high pressure spool valve. In use, such valves are connected in a hydraulic system for controlling the flow of fluid to various operative components of the system. In order to accomplish this purpose, the valve includes a body 10 which has formed therein a longitudinal passageway or bore 12 into which there is received a valve spool 14 that is movable longitudinally or from right to left in the drawings.

The bore 12 has a plurality of annular chambers, two such chambers 16 and 18 being connected to radial exhaust ports 20 and 22, respectively. A third chamber 24 is connected to an inlet port 26. As shown in the drawings, exhaust port 20 is located near the left end of body 10 while the exhaust port 22 is located near the opposite or right end of body 10. Inlet port 26 is located approximately midway between exhaust ports 20 and 22. Thus, the bore 12 is in fluid communication with the inlet port 26 and both of the exhaust ports 20 and 22, the flow between these ports being controlled by the position of the spool 14. In order to prevent a leakage of fluid from the bore 12, spool 14 is provided with a seal 28 located in an annular groove near the left end of the spool 14. Similarly, a seal 30 is provided in an annular groove formed in the spool 14 near its right end. Seals 28 and 30 can be of any suitable type formed from an elastomeric material such as rubber or the like.

Suitable stops 32 are provided at each end of the spool 14 exterior of the body 10 so as to limit movement of the spool 14. Also, spool 14 may be provided with a suitable knob or other operating handle 34 to permit manual operation of the spool valve. Of course, in place of knob 34 the spool 14 can be provided with a suitable connecting means (not shown) for connecting the spool 14 to any desired control device.

As shown in the drawings, the spool 14 has a central portion of a narrower diameter which thus forms a left land 36 and a right land 38. The diameters of lands 36 and 38 are slightly less than the diameter of the bore 12, the difference in diameter depending upon the tolerances desired.

The valve of the invention also includes an auxiliary chamber 40 which is an annular chamber formed around bore 12 to the left of exhaust port 20 and its respective chamber 16. Also, spool 14 is formed with an axially extending passageway 42 which is connected to a radial passageway or relief port 44 formed in left land 36, which port 42 allows fluid to flow between axial passageway 42 and the exterior of spool 14. Similarly, there is formed in the right land 38 a radial passageway or relief port 46 which is in fluid communication with the axial passageway 42. However, there is also formed in the right land 38 an annular groove 48 which groove 48 is also in communication with the relief port 46.

In FIG. 1, the spool 12 is shown shifted to the extreme left position. In this position, the high pressure fluid flows from inlet port 26 through chamber 24 and is exhausted through chamber 16 and exhaust port 20. Fluid flow is in this manner because the right land 38 has blocked flow from chamber 24 into exhaust chamber 18 whereas the left land 36 has moved sufficiently to the left to open communication between inlet chamber 24 and exhaust chamber 16. When spool 14 is in the position shown in FIG. 1, the hydraulic circuit in which the valve is connected will at this time vent exhaust port 22 to the atmosphere while exhaust port 20 is under pressure. On the other hand, when spool 14 is shifted to the right (FIG. 2), exhaust port 20 is vented to the atmosphere while port 22 is under pressure.

With the spool 14 in the position shown in FIG. 1, the high pressure fluid flowing from inlet chamber 24 to exhaust chamber 16 will leak around the left land 36 and into auxiliary chamber 40. With the spool 14 in its extreme left position as shown in FIG. 1, fluid from auxiliary chamber 40 will pass through relief port 44, through axial passageway 42, and then through relief port 46 and into exhaust chamber 18 which is at the vented or low pressure. Thus, seal 28 operates at the vented or low pressure.

Figure 2:
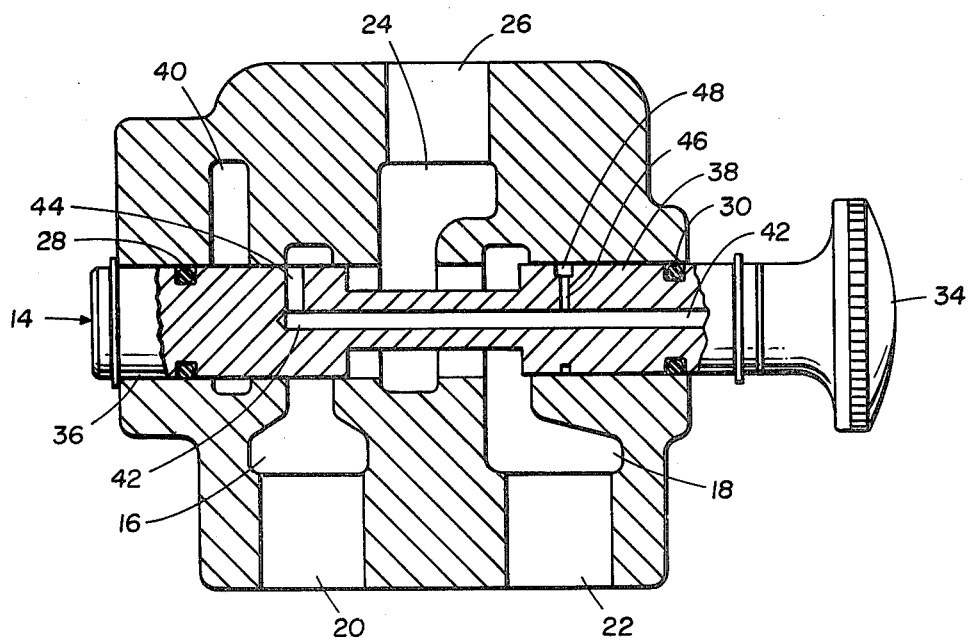
FIG. 2 is a view similar to FIG. 1 but showing the spool shifted to the extreme right position.

Similarly, when the spool 14 is shifted to the extreme right position shown in FIG. 2, flow of high pressure fluid is from inlet chamber 24 into the right exhaust chamber 18. In this position, the left land 36 blocks flow from inlet chamber 24 into the left exhaust chamber 16 while the right land 38 has moved sufficiently to the right to allow flow from chamber 24 into exhaust chamber 18. In the position shown in FIG. 2 left exhaust port 20 is vented to the atmosphere while exhaust port 22 is under high pressure. Leakage of high pressure fluid from right exhaust chamber 18 between land 38 and bore 12 passes into the annular groove 48 from where it flows through relief port 46 into the axial passageway 42 and then through relief port 44 into the low pressure chamber 16. Thus, seal 30 is subjected only to the low vented pressure.

From the foregoing description of the construction and operation of my novel fluid control valve, it is obvious that regardless of the position of the spool 14 the seals 28 and 30 will both be subjected only to the vented or low pressure. Thus, the seals will not deform into small surface imperfections in the bore 12 and shearing or abrading of the seals is greatly minimized. The life of the seals 28 and 30 will thus be greatly lengthened. Also, because seals 28 and 30 are subjected only to low pressure, the likelihood of a seal being "blown out" is practically eliminated. Obviously, modifications to known spool valves in order to achieve the invention are modifications that can be performed with relatively little added expense. Certainly, the expense of providing the additional necessary passageways and chambers is low compared to prior art attempts to solve the leakage and seal problem of high pressure control valves. Moreover, because the seals 28 and 30 are never subjected to high pressure, high breakaway friction is eliminated, and the amount of force necessary to shift the spool is relatively low and permits ease of manual operation of high pressure fluid control valves.

Although the invention has been illustrated only in connection with a preferred embodiment thereof, it will be obvious to those skilled in the art that the principles of the invention can be applied to all types of high pressure hydraulic or pneumatic spool type control valves. It will be further obvious to those skilled in the art that various revisions and modifications can be made in the specific preferred embodiment disclosed herein. It is my intention however that all such applications, and all such revision and modifications as are obvious to those skilled in the art, will be included within the scope of the following claims.

I claim:

1. A spool-type fluid control valve comprising a valve body having a bore, an inlet port and first and second exhaust ports axially spaced along and in fluid communication with said bore, a valve spool received in and axially movable within said bore between first and second positions, said first and second exhaust ports being alternately connected to low and high fluid pressure when said spool is moved from one position to the other, said spool having first and second lands axially spaced so that when said spool is in said first position the second land blocks fluid communication between said inlet port and said second exhaust port, and when said spool is in said second position, said first land blocks fluid communication between the inlet port and said first exhaust port, first seal means for preventing fluid leakage outwardly across said first land and second seal means for preventing fluid leakage outwardly across said second land, a first annular passageway around and in communication with said bore and spaced axially inwardly of said first seal means, a second annular passageway around and in communication with said bore and spaced axially inwardly of said second seal means, a first relief port in said first land and a second relief port in said second land, and an axially extending passageway in said spool providing fluid communication between said first and second relief ports, said first and second relief ports being axially spaced so that when said spool is in said first position, said first relief port is between said first seal and said first exhaust port and in communication with said first annular passageway while said second relief port is in communication with said second exhaust port, and when said spool is in said second position, said second relief port is between said second exhaust port and said second seal means and in communication with said second annular passageway while said first relief port is in communication with said second exhaust port, whereby said first and second seal means are each always subject to the low fluid pressure regardless of the position of said spool within said bore.

2. The fluid control valve of claim 1 in which said valve body has a plurality of annular chambers, each of said chambers being in communication with a respective one of said inlet and exhaust ports.

3. The fluid control valve of claim 2 in which said inlet port is located between said first and second exhaust ports.

4. The fluid control valve of claim 3 in which said first annular passageway is an annular chamber formed in said valve body around said bore and is located between said first seal means and the annular chamber in communication with the first exhaust port.

5. The fluid control valve of claim 4 in which said second annular passageway is an annular recess formed in said spool, said recess being located in said second land and in direct communication with said relief port.

6. The fluid control valve of claim 5 in which said first and second seal means are located in and movable with said spool, said first seal means being located in said first land and said second means being located in said second land.

7. The fluid control valve of claim 6 in which said spool has stop means to positively determine said first and second position.

* * * * *